Figure 1:
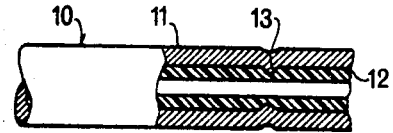

United States Patent

[11] 3,607,674

| [72] | Inventor | Erik Lauritzen |
| | | Gentofte, Denmark |
| [21] | Appl. No. | 719,294 |
| [22] | Filed | Mar. 21, 1968 |
| [45] | Patented | Sept. 21, 1971 |
| [73] | Assignee | Niels Bay-Schmith |
| | | Mosebakken, Virum, Denmark |
| [32] | Priority | Mar. 28, 1967 |
| [33] | | Denmark |
| [31] | | 1598/67 |

[54] METHOD FOR PRODUCING HOLLOW NEEDLES
2 Claims, 6 Drawing Figs.

[52] U.S. Cl. .................................................. 204/9,
117/94, 117/95, 204/15, 204/25, 204/26
[51] Int. Cl. .................................................. C23b 7/02,
C23b 5/48, C23b 5/56
[50] Field of Search .................................... 204/25, 15,
26, 9, 20; 117/94, 95

[56] References Cited
UNITED STATES PATENTS
| 1,733,608 | 10/1929 | Knox et al. .................. | 204/9 |
| 2,283,045 | 5/1942 | Carbonara .................... | 204/9 |
| 3,299,492 | 1/1967 | Sargent ........................ | 204/4 |
| 3,329,588 | 7/1967 | Mears ........................... | 204/25 |
| 3,451,839 | 6/1969 | Cauvin ......................... | 117/94 |

FOREIGN PATENTS
| 153,231 | 10/1920 | Great Britain ............... | |

OTHER REFERENCES

Some Tips on Electroforming by Marv Rubinstein, Metal Finishing, April 1956, pp. 58– 60.

Don't Overlook Electroforming by W. H. Safranek, Product Engineering, June 5, 1961.

*Primary Examiner*—Howard S. Williams
*Assistant Examiner*—T. Tufariello
*Attorney*—Richards & Geier

ABSTRACT: The invention relates to a method for producing hollow needles, such as cannulae, hypodermic needles and the like. A material, such as metal, is applied as discrete particles, e.g. electrogalvanicly, by chemical precipitation or by spraying, to a surface part of a basic body made from an easily shapeable material, such as plastics or glass. The basic body may be solid or tubular, and the metal layer may be applied to the outer and/or inner surface thereof. The basic body may also have such a form that a needle integral with another syringe part is produced. After the application of the basic layer the basic body material may be partly or totally removed, if desired.

PATENTED SEP 21 1971  3,607,674

INVENTOR.
E. Lauritzen
BY
Richards & Geier
ATTORNEYS

METHOD FOR PRODUCING HOLLOW NEEDLES

The invention relates to a method for producing hollow needles, such as cannulae, hypodermic needles and the like.

Hitherto hollow needles, such as cannulae and hypodermic needles have normally been produced from welded or seamless tubes of metal plate, these tubes having been reduced and drawn by use of several intervening annealings. Due to this laborious method of production the conventionally produced hollow needles, which are circularly cylindrical, are relatively expensive in comparison with the price of the starting material.

Therefore this invention has for its object to provide a method of the said type, which is substantially more simple than the known one, and by means of which hollow needles with arbitrary dimensions and shapes may be produced.

The method according to the invention is characterized in, that a layer of material suitable for making up such needles, such as metal, is applied as discrete particles, e.g. electrogalvanicly, by chemical precipitation, by spraying etc., to a surface of a basic body made from a relatively easily shapeable material, such as plastics or glass. The basic body, which is made from a relatively easily shapeable material, may without any difficulties be formed with a surface, the cross section and shape of which correspond to the cross section and shape of the needle, which is wanted to be produced. The easily shapeable material normally does not possess the rigidity or the toughness required for a practically useful needle, however, this disadvantage is remedied by the tubular body, which after the application of the layer of metal or another suitable material is formed by the same. Although the presently preferred material to be applied to the surface of the basic body is metal, it is contemplated that also other materials may be used. However, for the sake of convenience metal is generally referred to in the following specification.

In certain cases the metal, which is applied to the basic body, is not corrosion-resistant to all injection media, in connection with which the needle is intended to be used, whereas this is the case for the material, such as glass or plastics, from which the basic body is made. In such cases among other the layer of material may according to the invention advantageously be applied to the outer surface of a tubular basic body. In this manner it is possible to produce a hollow needle, which like the conventional hypodermic needles has an external metallic surface, but internally is provided with a corrosion-resistant lining constituted by the basic body.

According to the invention the basic body may be removed totally or partly, e.g. by axial boring or by melting, when the layer of material has been applied to the surface thereof. Thus, for example in cases where no corrosion risk exists, a hollow needle consisting totally of metal may be obtained, if desired. Alternatively, by boring out a part of the material of the basic body it is possible to obtain an increased inner diameter of the needle and to retain an internal lining, the wall thickness of which in itself is not sufficient to let the lining serve as basic body. Of course it will also be possible to remove only certain axial sections of the basic body.

According to the invention the layer of material may alternatively be applied to the inner surface of a tubular basic body. In this manner a needle with a very small cross section may be produced, and if the tubular basic body is removed partly or totally from the metal tube made, a very thin needle may be obtained.

According to the invention the layer of material may be applied to the outer surface of a solid, string-shaped basic body, which thereafter may be pierced longitudinally or be removed totally or partly, e.g. by melting. Due to the fact that the basic body is solid it may be made with a relatively small cross section, it being for example a drawn thread of plastics. Thus this method also enables the production of a hollow needle with a relatively small outer diameter.

When a hollow needle is to be used in connection with an injection syringe or an injection ampul, the needle must at first be fixed to a mounting member, which normally has the form of a cylindrical or conical sleeve, by means of which the needle may be mounted on the syringe or the syringe ampul.

By using the method according to the invention, however, the time-consuming and price-increasing fastening of the needle to the mounting member may be avoided, because according to the invention a string-shaped basic body having spaced thickenings may be used. When in accordance with the invention a metal layer is externally or internally applied to this string, which may be tubular or solid, and thereafter the string is cut between two adjacent thickenings and in the middle of each of the thickenings hypodermic needles formed integrally with a needle sleeve or a syringe cylinder or a part thereof may be obtained. Although the metal layer may be applied as a continuous layer in the whole length of the basic body, whereby as well the needle as the needle sleeve or syringe part are stiffened, but simultaneously made opaque by the metal layer, the metal layer may, if desired, be applied only along the parts of the string-shaped basic body, which are to form the needles themselves or at any rate the extreme free ends thereof. In this manner it may be obtained that syringe cylinder parts formed integrally with the hollow needles, become transparent, provided that the material from which the basic body is made, is transparent. As previously indicated the purpose of the metal layer which is applied to the basic body, is primarily to impart the necessary stiffness and toughness to the material of the basic body, and in a way the metal layer could be dispensed with if a material which could easily be given the shape desired, and which also possessed the hardness and toughness required for a hypodermic needle had been available.

According to the invention the basic body may be made from a cylindrical tube of a thermoplastic material, the outer diameter of said tube being substantially the same as that desired for the thickenings, and the axially spaced sections of the cylindrical tube may be subjected to drawing while heating. In this manner the special basic body may be made very simply, and furthermore the advantage is obtained that due to the molecular orientation occurring during drawing an increased strength and toughness are imparted to the thin string-shaped parts, which are to form a part of the needle itself.

According to the invention a basic body forming a thin discharge tube integral with a syringe or syringe ampul may be used, the material layer being applied to at least the free end of the discharge tube. In this manner syringe ampuls ready for use and of the disposal type may be made by a very simple working process, as the ampul itself may for example be of the compressible type enabling injection by compressing the ampul.

As mentioned above, if desired, the basic body may be removed totally by melting, when the metal layer has been applied to the surface thereof. In certain cases, however, where a good adherence is not obtained between the surfaces of the basic body and the metal layer, and where permitted by the shape of the basic body, the basic body may sometimes as a whole be pushed out from or pulled from the tubular body formed by the metal layer. If the basic body is not to be removed or is to be removed partly, only, the said bad adherence between the surfaces of the basic body and the metal layer is disadvantageous. According to the invention the surface of the basic body, to which the metal layer is applied, may in advance be provided with notchings or indentations prior to the application of the material layer. Thereby a relative, axial displacement between the basic body and the metal layer is prevented, although the adherence between the engaging surfaces of the said bodies is poor.

Figure 2:
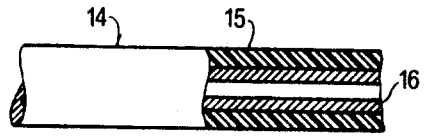
Figure 3:
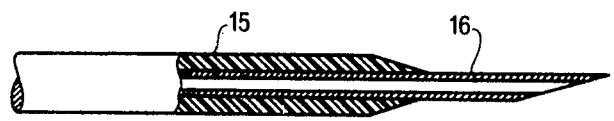
Figure 4:
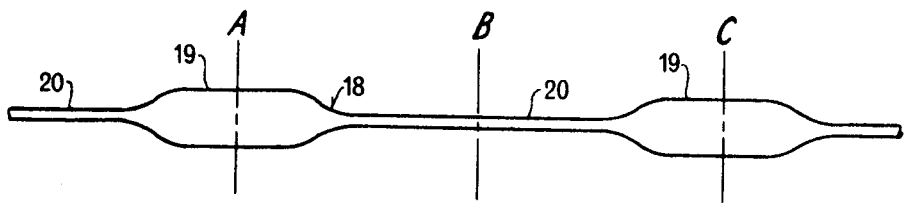
Figure 5:
Figure 6:
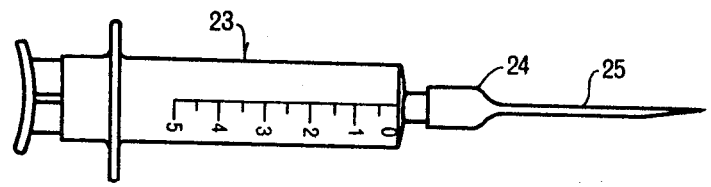

The objects and advantages of the invention will be more fully understood from the following specification referring to the drawings, in which:

FIG. 1 is an enlarged side view, partly in section, of a portion of a thin tube made by applying a metal layer to the outer surface of a tubular basic body, FIG. 2 is a side view, partly in section, of a portion of another tube, which has been made by applying a metal layer to the inner surface of a tubular basic body, FIG. 3 is a side view, partly in section, of the pointed end of a hypodermic needle made by the method according to the invention, FIG. 4 is a side view of a portion of a basic body with a shape suitable for mass or serial production of hypodermic needles, which are formed integrally with a mounting member or a hypodermic syringe cylinder or the front part thereof, FIG. 5 is a side view of a syringe ampul having a thin discharge tube made integral therewith, and FIG. 6 is a side view of a hypodermic syringe with a needle made by using a basic body of the type shown in FIG. 4.

FIG. 1 shows a portion of a thin tube 10 consisting of an external metal layer 11 and an internal lining 12 of plastics or glass. The tube 10 is concordant with the method according to the invention made thereby that a layer of one or more metals has been externally applied to a basic body in the form of a thin glass tube or an extruded tube of plastics, the diameter of which has preferably been reduced by drawing. This application of metal may be performed by any of the known methods. For example the outer surface of the basic body may initially be made electrically conductive by means of a chemically precipitated silver layer or by spraying on a graphite layer, and thereafter the basic body may be coated with a layer of nickel, or the application of the metal layer may be performed exclusively by chemically precipitation or by spraying the metal on in melted condition.

It is also possible to produce the tube 10 shown in FIG. 1 from a solid basic body, which may for example have the form of a thin drawn thread of plastics. In this case the basic body may be axially bored after the application of the metal layer. If desired, the solid basic body may be totally removed by melting.

The basic body used by the production of the thin tube 10 may in its outer surface, which is coated with the metal layer 11, be provided with one or more indentations or notchings, which serve to prevent that the metal layer 11 and the lining 12 are displaced axially in relation to one another due to poor adherence between their adjacent surfaces. In FIG. 1 an annular groove 13 having the said purpose is indicated in the outer surface of the lining 12. From the tube 10 hollow needles may be made by cutting the tube in appropriate sections and by sharpening a free end of each of the sections.

The lining 12, which as mentioned is normally of plastics or glass, may easily be given an inner surface, which is more smooth than the inner surfaces obtainable in normal hollow needles, and thus the lining 12 contributes to reduce the frictional resistance against the flowing of liquid through the needles made in accordance with the invention.

FIG. 2 shows a portion of a needle tube 14, which is made by the use of a tubular basic body 15, a metal layer 16 being applied to the inner surface thereof, e.g. by chemical precipitation.

From needle tubes of the type shown in FIG. 2 very thin tubular needles, such as hypodermic needles, may be made by using a tubular basic body 15 with a small inner diameter and by removing this basic body totally or partly after the precipitation of the metal layer 16.

FIG. 3 shows the pointed end of a needle, which is made from a tube of the type shown in FIG. 2. The tubular basic body is here removed at the extreme end of the needle, but retained at the remaining part thereof.

FIG. 4 shows a specially shaped basic body 18 enabling production of hypodermic needles formed integrally with a mounting member or an injection syringe part in a very simple manner. The string-shaped basic body 18 has a number of spaced thickenings 19 mutually connected by means of thin tubular parts 20. The basic body 18 may advantageously be made from a cylindrical plastics tube, as in this case the parts 20 may be made thereby, that spaced axial sections of the tube are subjected to a drawing while heating. To the basic body thus made may then, as explained above, internally or externally be applied a layer consisting of one or more metals or another suitable material as explained above. This metal layer may be applied continuously along the whole length of the basic body; however, if desired, the coating with the metal layer may be restricted to the tubular parts 20. If the basic body 18 provided with the metal layer is cut along the dot-and-dash lines A, B and C the samples obtained may after sharpening of the free ends of the parts 20 be used as hypodermic needles 25, which, as shown in FIG. 6, without any further ceremony may be mounted on an injection syringe 23 by means of the mounting member 24 formed by the associated half of a thickening 19. If desired the mounting member 24 may be fixed to the syringe cylinder by heat-sealing.

It is also possible to make a basic body of the type shown in FIG. 4 and having thickenings 19, which have such a diameter and such a length, that these thickenings, after the said cutting up of the metal coated basic member, may serve as syringe cylinders, each of which is thus formed integrally with a needle. In this case it will normally be found advantageous not to coat the thickenings 19 with metal in order not to spoil the possible transparency of the cylinders.

FIG. 5 shows a syringe ampul 21 of the compressible type and with a thin discharge tube 22 formed integrally with the ampul, e.g. by drawing of the material thereof while heating. This syringe ampul may be used as basic body, and in accordance with the invention at least the discharge tube 22 may externally or internally be coated with a metal layer, so that it obtains the rigidity required in order that it may serve as cannula or needle.

It may be understood that within the scope of the invention various modifications of the embodiments described above may be made and that the invention is in no way limited to the embodiments described with reference to the drawings. As an example it should be mentioned that the string-shaped basic body 18 may be made solid, as after the application of the metal layer to the outer surface thereof, it may be bored out or melted away. Furthermore, the basic bodies 18, 21 and 15 may like the basic body 12 advantageously be provided with indentations or notchings for increasing the adherence between the basic body and the metal layer.

I claim:

1. A method of producing a needle member having a hypodermic needle and integral mounting means therefor, said method comprising providing an elongated body member made from an easily shapeable material and having spaced portions of substantially circular cross section with a relatively small diameter, intervening portions corresponding to said mounting means and having a radial extension substantially exceeding that of said spaced body portions, applying a metal layer at least to surface parts of the body member portions of relatively small diameter and then transversely cutting said spaced and intervening portions, whereby hypodermic needles each having an integral socket-shaped mounting means are produced.

2. A method as claimed in claim 1, wherein said body member is made from a cylindrical tube of thermoplastic material, the outer diameter of said tube being substantially the same as that of said intervening portions, axially spaced portions of the cylindrical tube being subjected to drawing while heating to obtain said spaced portions of relatively small diameter.